Sept. 26, 1939.  C. A. RICH  2,174,292
SPINDLE CONTROL MECHANISM
Filed May 14, 1937  2 Sheets-Sheet 1
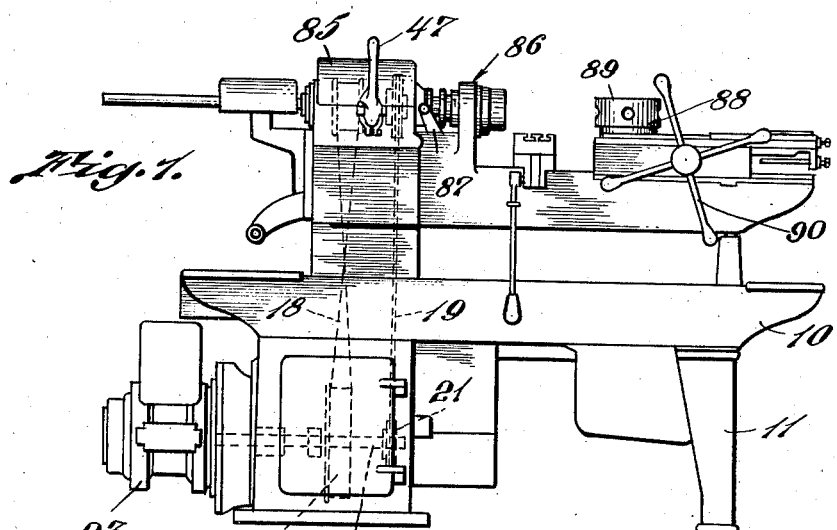
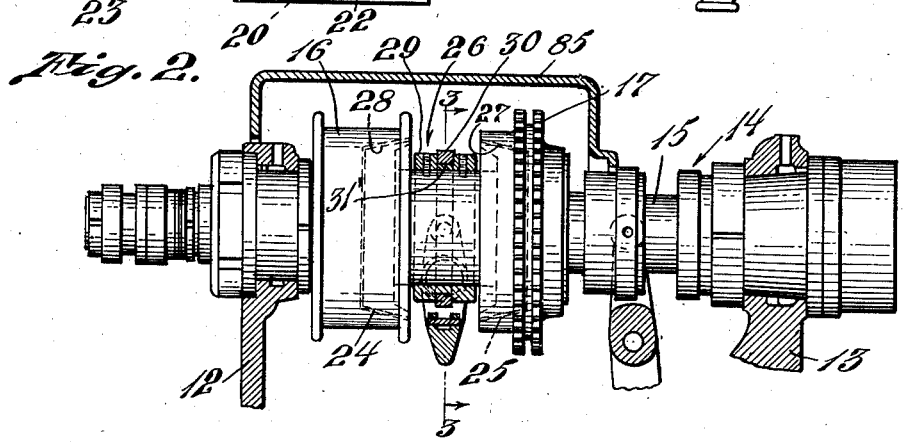
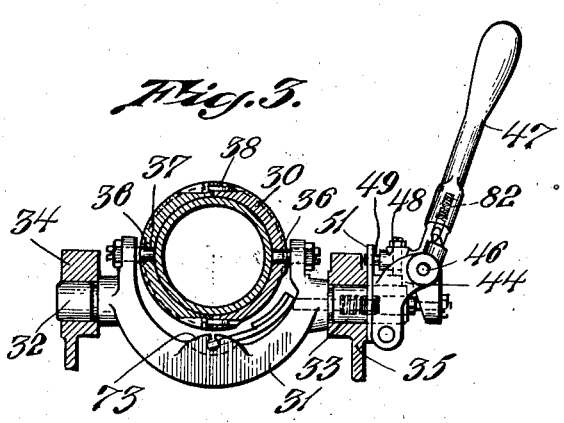
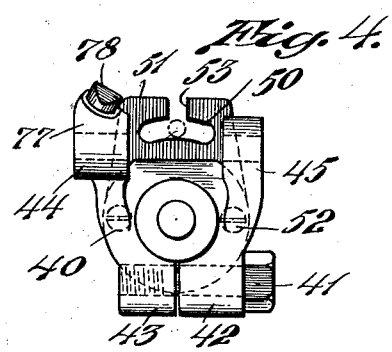
INVENTOR.
Charles A. Rich
BY Barlow & Barlow
ATTORNEYS.

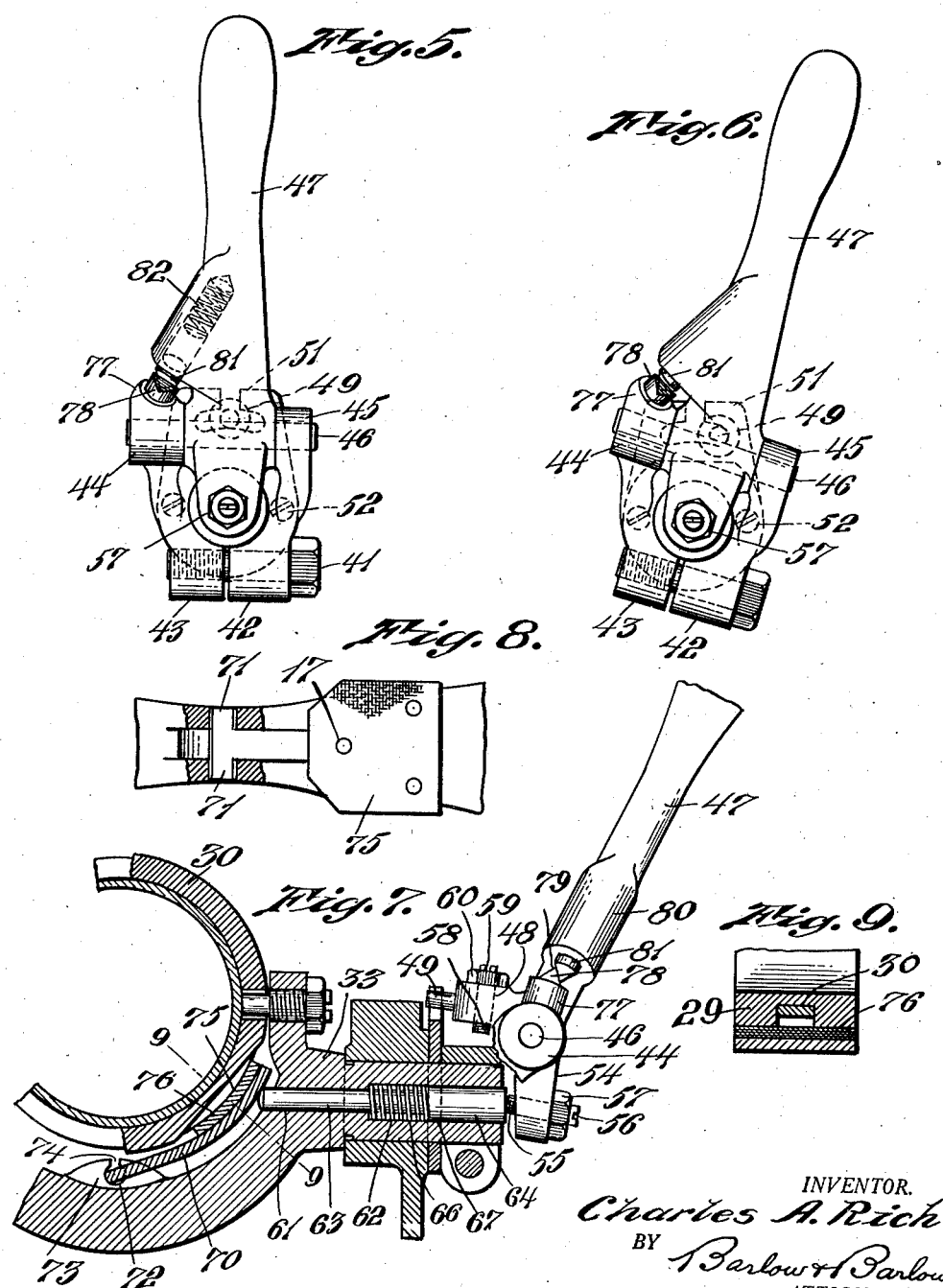

Patented Sept. 26, 1939

2,174,292

UNITED STATES PATENT OFFICE 2,174,292

SPINDLE CONTROL MECHANISM

Charles A. Rich, Providence, R. I., assignor to Brown & Sharpe Manufacturing Company, a corporation of Rhode Island Application May 14, 1937, Serial No. 142,667

20 Claims. (Cl. 192—4)

This invention relates to the control of a spindle adapted to rotate in opposite directions such as is present in a turret lathe some times called a wire feed screw machine; and has for one of its objects the provision of better control of the spindle than has heretofore been utilized in machines of this character.

Another object of the invention is the provision of a control lever which will have four different stations or positions such for instance as a position to direct a forward drive, a position to direct a reverse drive, a neutral position, and a brake applying position, each of which actuating positions may be selected from the neutral position without causing the handle to pass through any one of the other positions.

Another object of the invention is the provision of a single lever which may be moved from either forward or reverse driving position to neutral position and then to braking position to control a shaft, whereby the brake may optionally be applied without the necessity of actuation by a a separate lever.

Another object of the invention is the provision of a means for stopping and braking the shaft without stopping the prime mover, such as a motor or overhead belts for driving the shaft.

Another object of the invention is the provision of a spindle with control means actuated by a lever which may be moved from either of one or more driving positions to a stopped position with means to apply and maintain a brake on the spindle in the stopped position to prevent rotation of the spindle and maintain the spindle against creeping due to certain frictions which may exist between a constantly rotating prime mover and other parts of the machine intended to remain temporarily in neutral or inoperative position while certain hand operations are performed upon the work or in setting the tools of the machine.

Another object of the invention is to provide certain safety factors so as to require that the control lever be moved to neutral position before the same can be moved to apply a brake for stopping the machine, and conversely an arrangement so that the lever cannot be moved to cause rotation of the shaft until the brake is released from its gripping position on the shaft.

With these and other objects in view, the invention consists of certain novel features of construction, as will be more fully described, and particularly pointed out in the appended claims.

In the accompanying drawings:

Fig. 1 is an elevation of a turret lathe equipped with my invention;

Fig. 2 is an elevation partly in section of the spindle assembly and its bearings of the turret lathe;

Fig. 3 is a sectional view on substantially line 3—3 of Fig. 2 showing the clutch yoke in full;

Fig. 4 is an elevation of the bracket which is mounted upon the yoke for moving the same and also showing the plate with its slot therein which governs the movement of the lever;

Fig. 5 is a view similar to Fig. 4 showing the clutch lever as mounted in the bracket and in neutral position;

Fig. 6 is a view similar to Fig. 5 but showing the clutch lever as operated to forward drive position;

Fig. 7 is an enlarged fragmental portion in section through the clutch lever, yoke and brake;

Fig. 8 is a plan view of the brake and a portion of the yoke shown in section;

Fig. 9 is a sectional view on substantially line 9—9 of Fig. 7.

In the use of a turret lathe or wire feed screw machine the spindle assembly which is rotated in either forward or reverse directions by some power mechanism may have the power disengaged at some neutral position for the stopping of the same; and it is ofen necessary to allow the acquired momentum to rotate the spindle assembly for several seconds before it comes to a stop that measuring or subsequent operations may be performed on the work. In some cases a brake is automatically applied between forward and reverse which stops the shaft more quickly but no free neutral position for the spindle may be had in such cases. In other cases, a separate stopping device may be utilized which must be engaged by the operator separate and apart from the lever which is utilized for disconnection of the power, which arrangement permits the stopping device and the power being applied at the same time, and other detrimental results; and in order to avoid the objections present in these various known forms, I have arranged a brake which may be operated by the lever which controls the forward or reverse application of power when this lever is in neutral position; that is, a position where no power is applied, and from this position alone, so that the brake cannot be applied while there is any drive impressed upon the shaft. Likewise, I have arranged that the brake must be positively released before power can be applied to the shaft in either direction, the arrangement being such that from neutral position forward or reverse rotation may be impressed upon the shaft or the brake applied to the shaft by selecting which direction the lever will be moved, all without release of the lever or it being necessary to pass the lever through any one of the other three positions in order to arrive at the position desired, the arrangement being such that the operation of the spindle requires the movement of the lever in one plane, whereas the brake applying mechanism requires the movement of the lever in a plane at right angles thereto; and by a further arrangement I am able to maintain the brake set upon the shaft so as to avoid creeping of the shaft from the prime mover which is allowed to continue its movement, also locking the shaft against any movement which may be advantageous in setting up certain parts of the machine for the tools or work, while if desired to turn the shaft by hand the brake may be released for this purpose without the application of power; and the following is a more detailed description of the present embodiment of this invention, illustrating the preferred means by which these advantageous results may be accomplished:

With reference to the drawings, the invention is shown as applied to a turret lathe, although other spindles may be similarly actuated. 10 designates the bed portion of the lathe having supporting legs 11 and suitable bearings 12 and 13 for supporting the spindle assembly designated generally 14 and comprising a spindle 15 through which the work is fed. Rotatably mounted upon the spindle 15 is the spindle pulley 16 and a spindle sprocket 17, the spindle pulley being driven by the cross belt 18 and the spindle sprocket by the open chain 19 from a suitable pulley 20 and sprocket 21 on drive shaft 22 driven from some suitable source of power such as the electric motor 23. The spindle pulley and spindle sprocket have cone-shaped recesses 24 and 25 therein all in a usual known manner.

A clutch body 26 is mounted on the spindle and keyed thereto comprising oppositely directed cone members 27 and 28 with a clutch sleeve 29 and a clutch ring 30 mounted in a suitable groove 31' in the clutch sleeve 29. A clutch fork 31 is rockably mounted by means of its trunnions 32 and 33 in frame bearings 34 and 35 with studs 36 engaging enlarged holes 37 in the ring 30 so that as the fork is rocked in its bearings 34 and 35 the ring will cause the sleeve and its cone portions to be shifted one way or the other along the spindle or shaft for engagement with the spindle pulley or spindle sprocket. The ring 30 is formed in two parts held together by suitable bolts 38 and is sufficiently loose in its groove to prevent undue friction.

The boss or trunnion 33 of the clutch fork has a lever mounting bracket 40 bound thereon by means of the bolt 41 passing through boss 42 of the split collar of the bracket and threaded in the boss 43 thereof. This bracket 40 includes a pair of arms 44 and 45 having aligned bores for the reception of a pivot pin 46 for rockably mounting the clutch lever 47 which has an inwardly projecting finger 48 carrying a stud 58 which may be adjusted by means of its slot 59 and held in position by the lock nut 60 for abutting the collar of the bracket 40. This finger 48 carries pin 49 which projects into a slot 50 in a plate 51 which is fixed by means of screws 52 to the frame 35 in which the bearing for the trunnion 33 is located. Slot 50 is arcuate on a radius from the central axis of the trunnion 33 of the fork and is provided with a notch or opening 53 extending outwardly radially from this slot at an intermediate portion thereof, preferably from its center. The lever 47 is also equipped with a downwardly extending leg portion 54 which has a threaded stud 55 which may be adjusted by means of slot 56 and held in position by means of locking nut 57 therein.

The trunnion 33 is provided with an axial bore having one dimension 61 and a larger dimension 62 for the reception of a pin having one size 63 to fit the bore portion 61 and a larger size 64 to fit the bore portion 62. A spring 66 is located within the bore portion 62 and acts between the shoulder 67 formed between the small portion 63 and large portion 64 of the pin, and the shoulder 68 formed between the different sizes of the bore 61, 62 to move the outer end of the pin against the threaded stud 55, such movement being limited by the threaded stud 58 carried by the lever. A brake shoe 70 is provided with trunnions 71 which are pivotally mounted in the opening 72 in the ears 73 formed on either side of the clutch fork with a slot 74 leading from the opening 72 for the reception of the trunnions in positioning the same within the clutch fork prior to its assembly with the clutch ring 30. The ring 30 is cut away as at 75 so as to permit the lining portion 76 secured to the free end of the brake shoe to extend across and engage the clutch sleeve 29 on either side of the clutch ring for the application of pressure to the sleeve for retarding and stopping the movement of the spindle assembly. A boss 77 is provided on the end of the arm 44 with a fixed projection 78 extending upwardly therefrom which is tapered or so shaped as to provide an apex 79. The clutch lever 47 is provided with a boss 80 which has slidably mounted therein a detent 81 forced downwardly by spring 82 to snap from one side to the other of the fixed projection 78 in movement of the lever about its pivot 46.

If it is desired that the spindle be forwardly rotated the clutch lever 47 will be thrown to the right, as shown in Fig. 1, to cause the spindle to be driven by the chain 19, at which time the pin 49 will be swung over in the slot 50 to the position shown in Fig. 6, whereas if the reverse motion of the spindle is desired the clutch lever will be thrown in the opposite direction or to the left, as shown in Fig. 1, to cause motion to be transmitted to the spindle by the crossed belt 18, in which location the pin 49 will be at the other end of the slot 50. The position of the lever when substantially vertical or upright, as shown in Fig. 1, and also in Fig. 5, causes the clutch to be located, as shown in Fig. 2, and the pin 49 to be positioned substantially in the center of the slot, as shown in Fig. 4, which is a neutral position. In changing work or tools it has often been necessary to allow the momentum of the spindle assembly to expend itself by positioning the clutch in neutral position which consumes several seconds; and in order to reduce this time of waiting after the clutch handle has been moved to neutral position, such as shown in Fig. 1, the lever may be pulled outwardly or toward the operator of the machine, which may be accomplished only when the lever is in neutral position, as from this position the pin 49 may swing upwardly into the notch or opening 53 of the slot 50, while at all other positions it is blocked by the upper edge of the slot 50. The swinging of the lever about its pivot 46 causes the pin 64, 63 to be forced inwardly through the stud 55 against the pressure of the spring 66 to swing the brake shoe 70 about its pivot 71, 72 to cause the brake lining 76 to engage the clutch sleeve and retard movement of the spindle assembly until the same is stopped. It is not necessary that the clutch lever be held in this brake applying position as movement to this position causes the detent 81 to snap over the projection 78 to hold the lever in this brake applying position, so that after having stopped the spindle assembly is maintained stationary so that other operations may be performed while positively preventing the jarring of the clutch into either a reverse or forward driving position which might cause a creeping of the spindle and an injury to an operator who might at the time be working upon the change of tools or work in the machine.

There is also a safety factor present to prevent injury to the operating parts of the machine by reason of the plate with its slot 50 and notch 53, in that when the brake is applied and the pin is in the notch 53, the lever cannot be moved to rock the clutch ring for movement of the clutch, as the pin 49 will engage the edges of the notch 53 and be prevented from such movement, and thus the machine cannot be started when the brake is applied. Further, when the clutch lever is swung inwardly to its position for forward or reverse movement with the pin 49 in this slot the brake cannot be applied until the lever is in neutral position, as the pin would be prevented from rocking upwardly at all locations except in neutral where the pin is opposite the notch 53.

The remaining portions shown in the drawings are of usual construction, there being a guard 85 over the clutch body and the usual chuck mechanism for the work designated 86 with the clutch lever 87, while there is the turret assembly 88 with its turret 89 for the different tools which may be hand operated by the spider hand wheel 90.

It will be recognized, however, that this spindle control may be utilized in other machines than in a turret lathe and accordingly I do not limit the invention to a turret lathe or wire feed screw machine which is here illustrated.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a machine having a spindle which is rotatable in opposite directions, a control lever movable in a single plane and at an angle to said plane, means responsive to the movement of said control lever in said single plane to direct movement of the spindle in one or the other direction, and means responsive to the movement of said lever at an angle to said single plane for retarding movement of said spindle.

2. In a machine having a rotatable shaft, a brake for retarding rotation of said shaft, a control lever movable in a single plane and also at an angle to said single plane, means responsive to the movement of the lever in said single plane to direct movement of said shaft, and means responsive to the movement of the lever at an angle to said single plane to actuate said brake and retard movement of said shaft.

3. In a machine having a rotatable shaft, a brake for retarding rotation of said shaft, a control lever rockably in a single plane and also rockable at right angles to said single plane in certain positions of its movement in said single plane, means responsive to the movement of the lever in said single plane to direct rotative movement of said shaft, and means responsive to the movement of the lever at right angles to said single plane to actuate said brake and retard rotative movement of said shaft.

4. In a machine having a rotatable shaft, a brake for retarding rotation of said shaft, a control lever movable in a single plane and also at an angle to said single plane, means responsive to the movement of the lever in said single plane to direct movement of said shaft, there being positions for forward or reverse driving and a neutral position between said two driving positions of said lever and said means, means responsive to the movement of the lever at an angle to said single plane to actuate said brake and retard movement of said shaft, and means to prevent movement of said lever at an angle to said plane except when the lever is in said neutral position.

5. In a machine having a shaft which is rotatable in opposite directions, a control lever movable in a single plane and at an angle to said plane, means responsive to the movement of said control lever in said single plane to direct movement of the shaft in one or the other direction, there being positions for forward or reverse driving and a neutral position between said two driving positions of said lever and said means, means responsive to the movement of said lever at an angle to said single plane for retarding movement of said shaft, and means to prevent movement of said lever at an angle to said plane except when the lever is in said neutral position.

6. In a machine having a shaft which is rotatable in opposite directions, a control lever movable in a single plane and at an angle to said plane, means responsive to the movement of said control lever in said single plane to direct movement of the shaft in one or the other direction, there being positions for forward or reverse driving and a neutral position between said two driving positions of said lever and said means, means responsive to the movement of said lever at an angle to said single plane for retarding movement of said shaft, and means to prevent movement of said lever at an angle to said plane except when the lever is in said neutral position, said means comprising a pin on said lever and a plate with a slot therein into which said pin extends, and a notch in the edge of said slot to receive the pin when the lever is rocked from its neutral position.

7. In a machine having a rotatable shaft, a brake for retarding of said shaft, a control lever movable in a single plane and also at an angle to said single plane, means responsive to the movement of the lever in said single plane to direct movement of said shaft, means responsive to the movement of the lever at an angle to said single plane to actuate said brake and retard movement of said shaft, and means to hold the lever in brake actuating position.

8. In a machine having a shaft which is rotatable in opposite directions, a control lever movable in a single plane and at an angle to said plane, means responsive to the movement of said control lever in said single plane to direct rotative movement of the shaft in one or the other direction, means responsive to the movement of said lever at an angle to said single plane for stopping movement of said shaft, and means to hold said lever in said shaft stopping position.

9. In a machine having a rotatable shaft, a brake for retarding rotation of said shaft, a control lever movable in a single plane and also at an angle to said single plane, means responsive to the movement of the lever in said single plane to direct movement of said shaft, means responsive to the movement of the lever at an angle to said single plane to actuate said brake and retard movement of said shaft, and means to hold the lever in brake actuating position, said means comprising a spring latch and a catch, one carried by said lever and the other carried by a part with reference to which the lever is moved.

10. In a machine having a rotatable shaft, a brake for retarding rotation of said shaft, a control lever, a rockable yoke responsive to the movement of the lever to direct movement of said shaft, means responsive to a different movement of the lever and acting through the rockable axis of the yoke to actuate said brake and retard movement of said shaft.

11. In a machine having a rotatable shaft, a prime mover, means to connect and disconnect said prime mover to and from said shaft to rotate the same, a lever movable to control said means, said lever being movable in a different direction when said means are disconnected, and means responsive to the movement of the lever in said different direction to stop movement of said shaft whereby the prime mover may continue rotation and the shaft be stopped.

12. In a machine having a rotatable shaft, a prime mover, means to connect and disconnect said prime mover to and from said shaft to rotate the same, a lever movable in a single plane to control said means, said lever being movable out of said plane when said means are disconnected, and means responsive to the movement of the lever out of said plane to stop movement of said shaft whereby the prime mover may continue rotation and the shaft be stopped, and means to maintain said lever in shaft stopping position.

13. In a machine having a rotatable shaft, a prime mover, means to connect and disconnect said prime mover to and from said shaft to rotate the same in either of opposite directions with a neutral position between, a lever movable in a single plane to control said means and cause actuation of the shaft in either direction or a neutral poition of said means, said lever being movable out of said plane when said means are disconnected and in neutral, and a brake operable in response to the movement of the lever out of said plane to stop movement of said shaft whereby the prime mover may continue rotation and the shaft be stopped.

14. In a machine having a rotatable shaft, a prime mover, means to connect and disconnect said prime mover to and from said shaft to rotate the same in either of opposite directions with a neutral position between, a lever movable in a single plane to control said means and cause actuation of the shaft in either direction or in a neutral position of said means, said lever being movable out of said plane when said means are disconnected and in neutral, and a brake operable in response to the movement of the lever out of said plane to stop movement of said shaft whereby the prime mover may continue rotation and the shaft be stopped, and means to maintain said lever in brake applying position comprising a latch on said lever and a catch on a part with reference to which said lever moves.

15. In a machine, a control lever mounted to swing in a single plane and also in a plane at right angles thereto, a plate generally parallel to the first said plane with an arcuate slot therein, a pin on said lever movable in said slot, said slot having a notch in its edge to accommodate said pin when the lever is swung in the plane at right angles to said plane and plate.

16. In a machine, a control lever mounted to swing in a single plane and also in a plane at right angles thereto, a plate generally parallel to the first said plane with a slot therein on the arc of a radius having the axis of the swing of the lever as its center, a pin on said lever movable in said slot, said slot having a notch in its edge extending therefrom in the direction of a radius from said axis to accommodate said pin when the lever is swung in the plane at right angles to said plane and plate.

17. In a machine having a rotatable shaft, operating means for said shaft having a neutral position whereby no motion is transmitted to said shaft and another position whereby rotative movement is transmitted to said shaft, a brake for retarding movement of said shaft, a control lever for positioning said means to either of said positions or for operating said brake, and means to prevent movement of the lever to operate said brake except from the neutral position of said means.

18. In a machine having a rotatable shaft, operating means for said shaft having a neutral position whereby no motion is transmitted to said shaft and another position whereby rotative movement is transmitted to said shaft, a brake for retarding movement of said shaft, a control lever for positioning said means to either of said positions or for operating said brake, means to prevent movement of the lever to brake operating position except from the neutral position of said means, and means to prevent the movement of the lever from its brake applying position to its rotative position until first moved to release the brake.

19. In a machine having a rotatable shaft, operating means for said shaft having a neutral position whereby no motion is transmitted to said shaft and two other positions whereby rotative movement is transmitted to said shaft in either direction, a brake for retarding movement of said shaft, a control lever for positioning said means to either of said positions or for operating said brake, means to prevent movement of the lever to brake operating position except from the neutral position of said means, and means to prevent the movement of the lever from its brake applying position to its position for causing rotation of the shaft until first moved to release the brake.

20. In a machine having a rotatable shaft, a brake for retarding rotation of said shaft, a member provided with slots forming substantially a T-shape guide, a control lever in said guide having a neutral operating position at the junction of said slots and operating positions at either side of said neutral position in the slot leading in opposite directions from the neutral position and a brake applying position in the other slot, and means responsive to the motion of the lever to any of said positions to cause a corresponding control of said shaft.

CHARLES A. RICH.